United States Patent
Tung

(10) Patent No.: US 9,800,770 B2
(45) Date of Patent: Oct. 24, 2017

(54) VIDEO RECORDING SYSTEM SWITCHABLE BETWEEN DIFFERENT RECORDING FRAME RATES, AND METHOD FOR CONTROLLING A VIDEO RECORDING SYSTEM TO SWITCH BETWEEN DIFFERENT RECORDING FRAME RATES

(71) Applicant: Trans Electric Co., Ltd., Changhua (TW)

(72) Inventor: Wei-Shin Tung, Changhua (TW)

(73) Assignee: TRANS ELECTRIC CO., LTD., Changhua (TW)

( * ) Notice: Subject to any disclaimer, the term of this patent is extended or adjusted under 35 U.S.C. 154(b) by 0 days.

(21) Appl. No.: 15/153,016

(22) Filed: May 12, 2016

(65) Prior Publication Data
US 2017/0195539 A1    Jul. 6, 2017

(30) Foreign Application Priority Data
Dec. 30, 2015    (TW) .............................. 104221128 U

(51) Int. Cl.
H04N 5/232    (2006.01)
H04N 1/00    (2006.01)

(52) U.S. Cl.
CPC ......... *H04N 5/232* (2013.01); *H04N 1/00392* (2013.01); *H04N 2201/212* (2013.01)

(58) Field of Classification Search
CPC ............... H04N 5/232; H04N 1/00392; H04N 2201/212
See application file for complete search history.

(56) References Cited

U.S. PATENT DOCUMENTS

| | | | |
|---|---|---|---|
| 2008/0186392 A1* | 8/2008 | Matsuyama | H04N 5/232 348/294 |
| 2009/0154895 A1* | 6/2009 | Taoka | H04N 5/772 386/239 |
| 2011/0199496 A1* | 8/2011 | Muraki | H04N 5/772 348/218.1 |
| 2012/0189263 A1* | 7/2012 | Kato | H04N 5/23245 386/227 |
| 2013/0162853 A1* | 6/2013 | Kim | H04N 5/23293 348/220.1 |

* cited by examiner

*Primary Examiner* — Gevell Selby
(74) *Attorney, Agent, or Firm* — Burris Law, PLLC

(57) ABSTRACT

A video recording system includes an input unit and a video recording unit. The input unit generates a first operation signal upon receipt of a first trigger, and generates a second operation signal upon receipt of a second trigger. The video recording unit initiates operation in a first recording mode and records at a first frame rate in the first recording mode upon receipt of the first operation signal, and switches operation into a second recording mode and records in the second recording mode at a second frame rate that is different from the first frame rate upon receipt of the second operation signal when the video recording unit operates in the first recording mode.

7 Claims, 2 Drawing Sheets

VIDEO RECORDING SYSTEM SWITCHABLE BETWEEN DIFFERENT RECORDING FRAME RATES, AND METHOD FOR CONTROLLING A VIDEO RECORDING SYSTEM TO SWITCH BETWEEN DIFFERENT RECORDING FRAME RATES

CROSS-REFERENCE TO RELATED APPLICATION

This application claims priority of Taiwanese Patent Application No. 104221128, filed on Dec. 30, 2015.

FIELD

The disclosure relates to a video recording system, and more particularly to a video recording system whose recording modes may be rapidly switched.

BACKGROUND

When using a conventional video recording device, such as a camera, a video event data recorder, etc., a user may need to enter several levels of a menu for switching a current recording mode (e.g., a regular recording mode corresponding to a frame rate of 30 fps) to a desired recording mode (e.g., a time-lapse recording mode corresponding to a frame rate of 1 fps). Then, the user has to exit the menu, followed by pressing a recording button to start recording in the desired recording mode. Accordingly, time is unwillingly spent on these complicated steps every time change of the recording mode is desired, leading to inconvenience of use.

SUMMARY

Therefore, an object of the disclosure is to provide a video recording system whose recording modes may be rapidly switched.

According to the disclosure, the video recording system includes an input unit and a video recording unit. The input unit is configured to generate a first operation signal upon receipt of a first trigger, and to generate a second operation signal upon receipt of a second trigger. The video recording unit is disposed to receive the first operation signal and the second operation signal, and is configured to initiate operation, upon receipt of the first operation signal, in a first recording mode and to record at a first frame rate in the first recording mode, and to switch operation, upon receipt of the second operation signal when the video recording unit is recording in the first recording mode, into a second recording mode and to continue the recording in the second recording mode at a second frame rate that is different from the first frame rate.

Another object of the disclosure is to provide a method for controlling recording operation of the video recording system of this disclosure.

According to the disclosure, the method includes the steps of: generating, by the input unit, a first operation signal upon receipt of a first trigger; generating, by the input unit, a second operation signal upon receipt of a second trigger; upon receipt of the first operation signal by the video recording unit, initiate, by the video recording unit, operation in a first recording mode and record in the first recording mode at a first frame rate; and upon receipt of the second operation signal by the video recording unit when the video recording unit operates in the first recording mode, switch, by the video recording unit, operation into a second recording mode and continue the recording in the second recording mode at a second frame rate that is different from the first frame rate.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
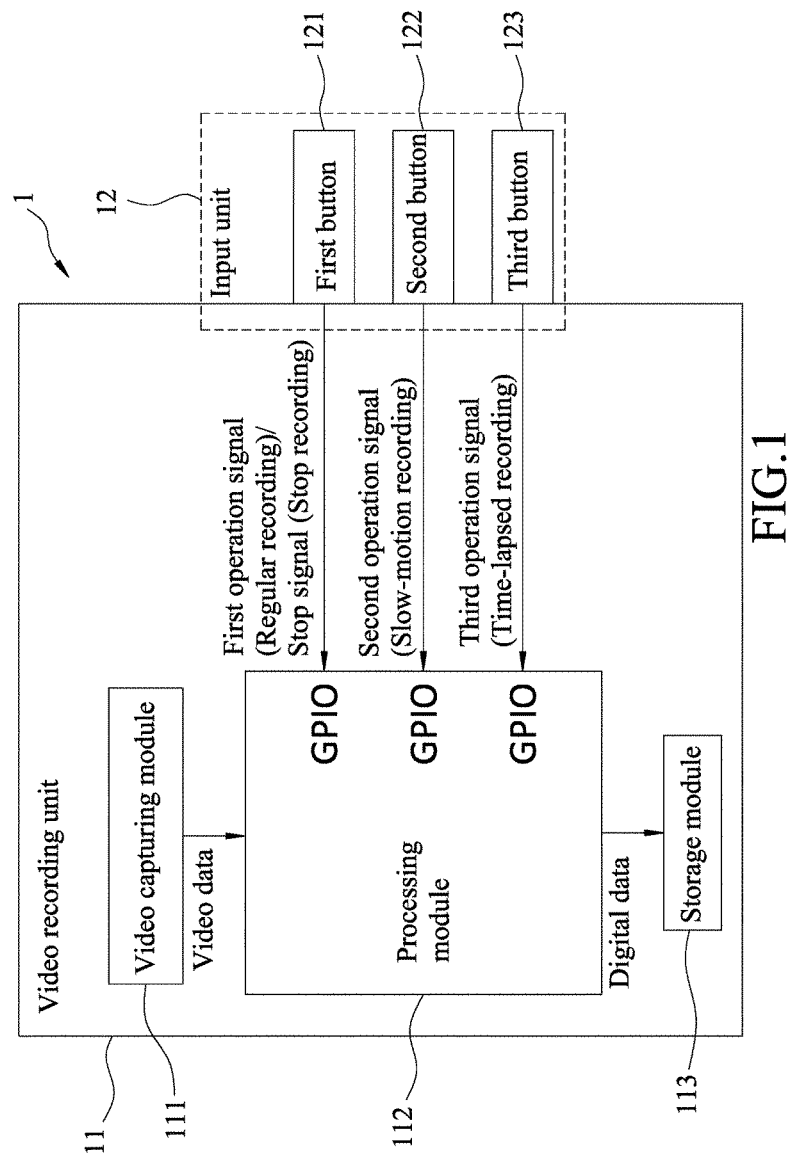
FIG. 1 is a schematic diagram illustrating an embodiment of a video recording system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the video recording system 1 according to this disclosure is shown to include an input unit 12 and a video recording unit 11. The video recording system 1 may be a digital video camera, a smartphone, a video event data recorder, etc.

The input unit 12 is configured to generate a first operation signal upon receipt of a first trigger, to generate a second operation signal upon receipt of a second trigger, to generate a third operation signal upon receipt of a third trigger, and to generate a stop signal upon receipt of a stop trigger. In detail, the input unit 12 includes a first button 121 that receives an input (e.g., a user's pressing) to serve as the first trigger or the stop trigger, and thus generates the first operation signal or the stop signal, a second button 122 that receives an input to serve as the second trigger and thus generates the second operation signal, and a third button 123 that receives an input to serve as the third trigger and thus generates the third operation signal. Each of the first, second and third buttons 121, 122, 123 may be a physical button or a virtual button. In this embodiment, generation of the first operation signal or the stop signal is determined according to a length of continuous receipt of the input by the first button 121, but this disclosure is not limited thereto. As an example, the first button 121 generates the first operation signal upon continuous receipt of the input for a duration shorter than a predetermined duration (i.e., a short button press), and generates the stop signal upon continuous receipt of the input for a duration longer than the predetermined duration (i.e., an extended button press).

The video recording unit 11 is configured to receive the first operation signal, the second operation signal, the third operation signal or the stop signal, and operates accordingly. In detail, the video recording unit 11 is configured to initiate operation, upon receipt of the first operation signal, in a first recording mode and to record at a first frame rate in the first recording mode. The video recording unit 11 is further configured to switch operation, upon receipt of the second operation signal when the video recording unit 11 operates in the first recording mode, into a second recording mode and to continue the recording in the second recording mode at a second frame rate that is different from the first frame rate. The video recording unit 11 is further configured to switch operation, upon receipt of the third operation signal when the video recording unit 11 operates in the first recording mode, into a third recording mode and to continue the recording in the third recording mode at a third frame rate that is different from the first and second frame rates. Moreover, the video recording unit 11 is further configured to switch operation, upon receipt of the second operation signal when the video recording unit 11 operates in the third recording mode, into the second recording mode and to continue the recording in the second recording mode at the second frame rate, to switch operation, upon receipt of the third operation signal when the video recording unit 11 operates in the second recording mode, into the third recording mode and to continue the recording in the third recording mode at the third frame rate, and to switch operation, upon receipt of the first operation signal when the video recording unit 11 operates in either the second recording mode or the third recording mode, into the first recording mode and to continue the recording in the first recording mode at the first frame rate. In other words, during recording of the video recording unit 11, the operation of the video recording unit 11 is switchable among the first, second and third recording modes without interruption of the recording, such that a resultant video may be a continuous video with different segments corresponding to different frame rates. In this embodiment, the first recording mode is a regular recording mode, the second recording mode is a slow-motion recording mode, and the third recording mode is a time-lapsed recording mode. Accordingly, the third frame rate is smaller than the first frame rate, and the first frame rate is smaller than the second frame rate in this embodiment. However, the disclosure is not limited to such. The video recording unit 11 is further configured to stop the recording upon receipt of the stop signal, regardless of which one of the first, second and third recording modes the video recording unit 11 is currently operating in.

In this embodiment, the video recording unit 11 includes a video capturing module 111, a processing module 112 and a storage module 113.

The video capturing module 111 is configured to capture video, and to convert the video thus captured into video data.

The processing module 112 is coupled to the video capturing module 111 for receiving therefrom the video data, and includes three general purpose input/output (GPIO) ports for respectively receiving the signals generated by the first, second and third buttons 121, 122, 123. The processing module 112 determines subsequent operation (i.e., recording at the first, second or third frame rate, or stopping the recording) according to the signal received by the GPIO ports. In the case where the operation is to record in one of the first, second and third recording modes, the processing module 112 generates digital data from the video data according to the frame rate that corresponds to the recording mode thus determined.

The storage module 113 is coupled to the processing module 112 for receiving therefrom and storing the digital data. The digital data is the result of the "recording" operation.

Figure 2:
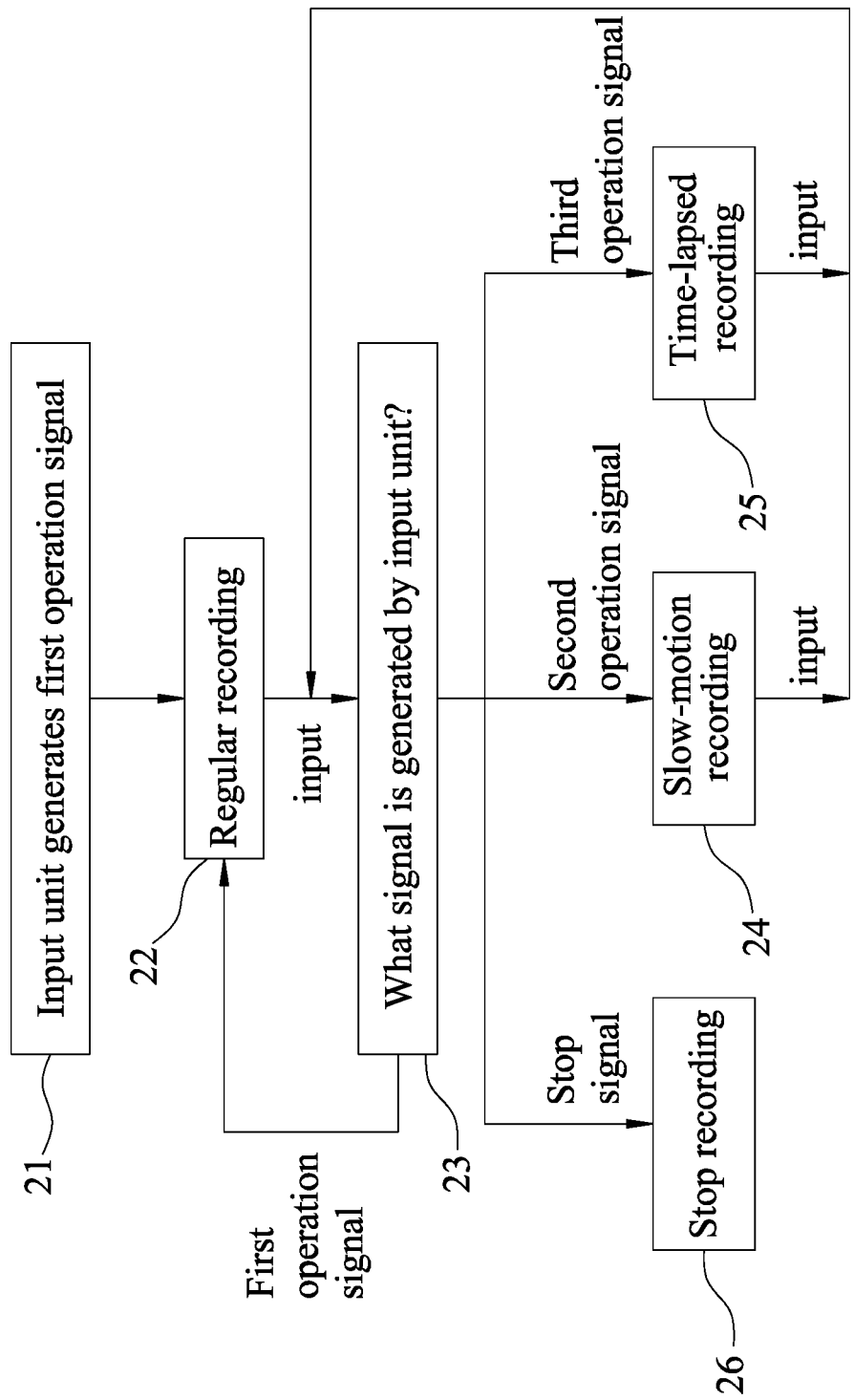
FIG. 2 is a flow chart illustrating steps of a method for controlling recording operation of the embodiment of the video recording system.

Referring to FIG. 2, a method for controlling recording operation of the video recording system 1 according to this disclosure is shown to include the following steps 21 to 26.

Step 21: The input unit 12 generates the first operation signal upon receipt of the first trigger (e.g., user's pressing on the first button 121 for a duration shorter than the predetermined duration).

Step 22: The video recording unit 11 receives the first operation signal, and initiates operation in the regular recording mode, and begins to record at the first frame rate in the regular recording mode. The flow goes to step 23 when the input unit 12 receives another trigger.

Step 23: The input unit 12 generates one of the first operation signal, the second operation signal, the third operation signal and the stop signal upon receipt of another input (one of the first, second, third and stop triggers). In detail, the flow goes to step 22 again when the input unit 12 generates the first operation signal (due to, e.g., user's pressing on the first button 121), to step 24 when the input unit 12 generates the second operation signal (due to, e.g., user's pressing on the second button 122), to step 25 when the input unit 12 generates the third operation signal (due to, e.g., user's pressing on the third button 123), and to step 26 when the input unit 12 generates the stop signal (due to, e.g., user's pressing on the first button 121 for a duration longer than the predetermined duration).

Step 24: The video recording unit 11 switches operation into the second recording mode and continues the recording at the second frame rate in the second recording mode (i.e., seamless transition from recording at the first frame rate to recording at the second frame rate). The flow goes back to step 23 when the input unit 12 receives another input.

Step 25: The video recording unit 11 switches operation into the third recording mode and continues the recording at the third frame rate in the third recording mode (i.e., seamless transition from recording at the first frame rate to recording at the third frame rate). The flow goes to step 23 when the input unit 12 receives another input.

Step 26: The video recording unit 11 stops the recording.

As an example, referring to FIG. 1, when a user presses the first button 121, the input unit 12 generates the first operation signal, and the video recording unit 11 starts recording in the regular recording mode to generate the digital data at a frame rate of, for example, 30 fps. Meanwhile, the processing module 112 continuously determines whether or not another signal is received from the input unit 12 (i.e., as a result of whether or not any one of the buttons 121, 122, 123 is pressed by the user). When the second button 122 is pressed so that the input unit 12 generates the second operation signal, the video recording unit 11 is switched to operate in the slow-motion recording mode so that the processing module 112 changes to generating the digital data at a frame rate of, for example, 120 fps. Similarly, when the third button 123 is pressed so that the input unit 12 generates the third operation signal, the video recording unit 11 is switched to operate in the time-lapsed recording mode so that the processing module 112 changes to generating the digital data at a frame rate of, for example, 1 fps. In addition, when the first button 121 is continuously pressed for a duration longer than the predetermined duration, the input unit 12 generates the stop signal, and the video recording unit 11 thus stops the recording (i.e., the video capturing module 111 stops converting the captured video into the video data, and the processing module 112 stops generation of the digital data).

Accordingly, after pressing the first button 121 to start regular recording, the user may subsequently press the second button 122 or the third button 123 to rapidly enter the desired slow-motion recording mode or time-lapsed recording mode. When it is desired to terminate the recording, the user may perform the extended button press on the first button 122 for a duration longer than the predetermined duration to rapidly stop recording without entering/exiting multiple levels of menu, thereby facilitating ease of operation.

In summary, when using the video recording system 1 of this disclosure, the user may use the first button 121, the second button 122 or the third button 123 to rapidly switch between recording modes, thereby saving operation time and achieving convenient operation.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A video recording system comprising:
    an input unit configured to generate a first operation signal upon receipt of a first trigger, and to generate a second operation signal upon receipt of a second trigger; and
    a video recording unit disposed to receive the first operation signal and the second operation signal, and configured to initiate operation, upon receipt of the first operation signal, in a first recording mode and to record at a first frame rate in the first recording mode, and to switch operation, upon receipt of the second operation signal when said video recording unit is recording in the first recording mode, into a second recording mode and to continue the recording in the second recording mode at a second frame rate that is different from the first frame rate;
    wherein the first recording mode is a regular recording mode, and the second recording mode is one of a slow-motion recording mode and a time-lapse recording mode;
    wherein said input unit includes a first button configured to receive an input to serve as the first trigger, and a second button configured to receive the input to serve as the second trigger;
    wherein said input unit is further configured to generate a third operation signal upon receipt of a third trigger, said input unit further includes a third button configured to receive an input to serve as the third trigger, and said video recording unit is further disposed to receive the third operation signal, and is further configured to switch operation, upon receipt of the third operation signal when said video recording unit operates in the first recording mode, into a third recording mode and to continue the recording in the third recording mode at a third frame rate;
    wherein the second recording mode is the slow-motion recording mode and the third recording mode is the time-lapsed recording mode; and
    wherein the first frame rate is smaller than the second frame rate, and the third frame rate is smaller than the first frame rate.

2. The video recording system of claim 1, wherein said input unit is further configured to generate a stop signal upon receipt of a stop trigger received by said first button;
    wherein said video recording unit is further disposed to receive the stop signal, and is further configured to stop the recording upon receipt of the stop signal.

3. The video recording system of claim 2, wherein the first trigger and the stop trigger differs from each other in a length of continuous receipt of the input by said first button.

4. The video recording system of claim 3, wherein said input unit is configured to generate the first operation signal when said first button receives the input that continues for a duration shorter than a predetermined duration and that serves as the first trigger, and is further configured to generate the stop signal when said first button receives the input that continues for a duration longer than the predetermined duration and that serves as the stop trigger.

5. A video recording system comprising:
    an input unit configured to generate a first operation signal upon receipt of a first trigger, and to generate a second operation signal upon receipt of a second trigger; and
    a video recording unit disposed to receive the first operation signal and the second operation signal, and configured to initiate operation, upon receipt of the first operation signal, in a first recording mode and to record at a first frame rate in the first recording mode, and to switch operation, upon receipt of the second operation signal when said video recording unit is recording in the first recording mode, into a second recording mode and to continue the recording in the second recording mode at a second frame rate that is different from the first frame rate;
    wherein said input unit is further configured to generate a third operation signal upon receipt of a third trigger;
    wherein said video recording unit is further disposed to receive the third operation signal, and is further configured to switch operation, upon receipt of the third operation signal when said video recording unit operates in the first recording mode, into a third recording mode and to continue the recording in the third recording mode at a third frame rate; and
    wherein the third frame rate is smaller than the first frame rate, and the first frame rate is smaller than the second frame rate.

6. A video recording system comprising:
    an input unit configured to generate a first operation signal upon receipt of a first trigger, and to generate a second operation signal upon receipt of a second trigger; and
    a video recording unit disposed to receive the first operation signal and the second operation signal, and configured to initiate operation, upon receipt of the first operation signal, in a first recording mode and to record at a first frame rate in the first recording mode, and to switch operation, upon receipt of the second operation signal when said video recording unit is recording in the first recording mode, into a second recording mode and to continue the recording in the second recording mode at a second frame rate that is different from the first frame rate;
    wherein said input unit is further configured to generate a stop signal upon receipt of a stop trigger;
    wherein said video recording unit is further disposed to receive the stop signal, and is further configured to stop the recording upon receipt of the stop signal; and wherein the first trigger and the stop trigger differs from each other in a duration thereof.

7. The video recording system of claim 6, wherein said input unit is configured to generate the first operation signal upon receipt of the first trigger which lasts for a duration shorter than a predetermined duration, and to generate the stop signal upon receipt of the stop trigger which lasts for a duration longer than the predetermined duration.

* * * * *